United States Patent [19]

Tseng

[11] Patent Number: 5,695,640
[45] Date of Patent: Dec. 9, 1997

[54] HYDROPHILIZED POROUS ARTICLE

[75] Inventor: Hsiao-Show Tseng, Stamford, Conn.

[73] Assignee: Minnesota Mining and Manufacturing Company, St. Paul, Minn.

[21] Appl. No.: 646,756

[22] Filed: May 1, 1996

Related U.S. Application Data

[63] Continuation of Ser. No. 184,692, Jan. 21, 1994, abandoned.

[51] Int. Cl.$^6$ .................................................. B01D 39/00
[52] U.S. Cl. ........................ 210/500.38; 210/500.27; 210/490; 210/500.36; 210/500.4; 210/500.41; 428/288
[58] Field of Search ............................. 210/500.27, 490, 210/500.38, 500.36, 500.37, 500.39, 500.34, 500.41, 500.23, 500.4; 428/288, 289, 357, 361, 407

[56] References Cited

U.S. PATENT DOCUMENTS

| | | |
|---|---|---|
| Re. 30,754 | 9/1981 | Hammer et al. . |
| 3,744,642 | 7/1973 | Scala et al. ............................ 264/41 |
| 4,214,020 | 7/1980 | Ward et al. ............................ 210/490 |
| 4,340,480 | 7/1987 | Pall et al. ............................ 210/500.38 |
| 4,501,793 | 2/1985 | Sarada ................................. 428/315.5 |
| 4,539,256 | 9/1985 | Shipman .............................. 428/315.5 |
| 4,645,602 | 2/1987 | Barnes, Jr. et al. ................ 210/500.38 |
| 4,654,265 | 3/1987 | Kamei et al. ........................ 428/398 |
| 4,702,840 | 10/1987 | Degen et al. ....................... 210/638 |
| 4,726,989 | 2/1988 | Mrozinski ........................... 428/315.5 |
| 4,871,790 | 10/1989 | Lamanna et al. ................... 523/333 |
| 4,889,636 | 12/1989 | Perry et al. ......................... 210/651 |
| 4,944,879 | 7/1990 | Steuck ................................ 210/500.27 |
| 4,948,508 | 8/1990 | Nakagawa et al. ................ 210/500.36 |
| 5,137,633 | 8/1992 | Wang .................................. 210/490 |
| 5,139,881 | 8/1992 | Henis et al. ........................ 424/488 |
| 5,143,616 | 9/1992 | Pall et al. ........................... 210/500.38 |
| 5,152,901 | 10/1992 | Hodgdon ............................ 210/500.38 |
| 5,290,452 | 3/1994 | Schucker ............................ 210/640 |

FOREIGN PATENT DOCUMENTS

| | | |
|---|---|---|
| 0 203 459 | 12/1985 | European Pat. Off. . |
| 0 203 459 A2 | 12/1986 | European Pat. Off. ........ B01D 13/14 |
| WO 92/07899 | 5/1992 | WIPO ................................ C08J 7/04 |

OTHER PUBLICATIONS

Karl H. Inderfurth, *Nylon Technology*, McGraw-Hill Book Company, Inc. (1953) pp. 22–33.

Van A. Wente, "Superfine Thermoplastic Fibers", *Industrial Engineering Chemistry*, vol. 48, pp. 1342 et seq. (1956) Naval Research Laboratory.

Souheng Wu, "Polymer Interface and Adhesion", Marcel Dekker, New York, New York (1982) pp. 235–255.

*Primary Examiner*—Ana Fortuna
*Attorney, Agent, or Firm*—Gary L. Griswold; Walter N. Kirn; Roger R. Tamte

[57] ABSTRACT

A hydrophilic porous article is provided. The article comprises a hydrophobic porous substrate having coated on at least one external surface and on the internal surface a polyamide. Also provided is a method for making the hydrophilic porous article comprising forming a solvent solution of polyamide in calcium chloride and methanol; treating a hydrophobic porous substrate by applying the solution to the substrate; rinsing the treated substrate with water to remove the calcium chloride and methanol; and drying the treated substrate.

13 Claims, No Drawings

HYDROPHILIZED POROUS ARTICLE

This is a continuation of application Ser. No. 08/184,692 filed Jan. 21, 1994, now abandoned.

FIELD OF THE INVENTION

The present invention relates to hydrophilized porous articles such as membranes, beads, films, fibers and fabrics having a hydrophobic base and a coating thereon to provide hydrophilicity, the use of the articles in separation, drug delivery, image forming, and purification processes, and the method of preparing such articles.

BACKGROUND

The chemical inertness of many porous polymer materials makes them ideally suited for forming membranes, beads, films, fibers, fabrics and the like, for use in separation, drug delivery, image forming, oxygen scavenging and other purification processes. Porous membranes can be used as filtration membranes, catalysis support membranes, imbibed membranes for further reactions, and the like. For example, porous membranes have been utilized in a wide variety of applications such as for the filtration of particles from liquids, the ultrafiltration of colloidal matter, as diffusion barriers or separators in electrochemical cells and batteries, and for filtration of antibiotics, beer, oils, bacteriological samples, intravenous fluids, vaccines and the like. Porous films are also utilized for air filter applications where it is important to filter very small particles out of an air stream.

Many polymeric materials are hydrophobic. When such materials are formed into membranes, beads, films, fibers, fabrics and the like, their hydrophobic nature prevents or inhibits wetting with water or other high surface tension liquids when the pore size is small enough for capillary forces to prevent wetting. This hydrophobicity is a major limitation for some applications that require such wetting by a high surface tension liquid to occur.

When used to describe a surface, the term "hydrophobic" means that water on that surface has a contact angle of greater than ninety degrees. By contrast, the term "hydrophilic" applies to those surfaces on which water has a contact angle of less than ninety degrees.

A useful measure of "wetting" capability is pore wetting surface energy. "Pore wetting surface energy" means the surface energy of the supporting structure required for spontaneous wetting of a pore through the wicking of water into the pore via capillary forces. Spontaneous wetting of the pore occurs when the surface energy of the internal surface of the pores is high enough for water to have less than a 90° contact angle with the surface. Analytically, according to Wu, S., *Polymer Interface and Adhesion*, Marcel Dekker, New York, 1982, p. 244, spontaneous wetting occurs when the capillary force, $\Delta P_c$, in the following equation is positive:

$$\Delta P_c = 2\sigma_L \cos\theta / r$$

where $\sigma_L$ is liquid surface tension (72.8 dynes/cm for water), $\theta$ is the contact angle, and r is the pore radius.

The magnitude of the positive capillary force correlates to the rate of spontaneous wetting. The variation in pore size and complex geometric configuration also assists in controlling the rate of wicking.

Hydrophilized porous membranes are useful in a variety of application areas which require wetting by a high surface energy liquid including but not limited to filtration media, electro-plating, battery separators, waste water and microbiological substrate processing, and lithographic printing.

Hydrophilization, i.e., treatment of a hydrophobic material to provide hydrophilicity, of porous hydrophobic membranes is known and has been practiced. Various methods used to provide hydrophilicity include, for example, treatment of microporous films with nonionic suffactants; coating a microporous film with a hydrophobic-hydrophilic copolymer, preferably ethylene-vinyl alcohol, in an organic solvent and drying the solvent leaving the copolymer as a coating on and in the film; and coating a porous hollow fiber having a large number of micropores in its surrounding wall with ethylene oxide-grafted nylon, such as ethylene oxide-grafted nylon 6. However, these coatings are deficient in that they may be removed by contact with various solvents such as alcohols.

Hydrophilicity may also be imparted by applying an extremely thin, self-interlocking shell of tactic, hydrophilic poly(vinyl alcohol) to envelop the surfaces of normally hydrophobic materials.

While these methods impart hydrophilicity to a normally hydrophobic porous article, they suffer from a lack of thermal and chemical stability.

SUMMARY OF THE INVENTION

The present invention, in one aspect, provides a hydrophilic porous article comprising a hydrophobic porous substrate having coated on at least one external surface and on the internal surface a polyamide.

The present invention, in another aspect, provides a method for making a hydrophilic porous polymeric article comprising the steps of forming a solution of polyamide in calcium chloride and methanol, treating a hydrophobic porous polymeric substrate by applying the solution to the substrate; rinsing the treated substrate with water to remove the calcium chloride and methanol; and drying the treated substrate to provide, a hydrophilic porous article.

The hydrophilic microporous articles of the present invention have permanent wettability, excellent chemical and thermal stability, and improved mechanical strength over the uncoated article.

The present invention also provides a hydrophilic membrane for electroplating residue barriers which traps debris but does not substantially impair electroplating current. The residue barrier of the present invention, either surrounding an anode or positioned between an anode and a cathode of an electroplating device, does not appreciably interrupt the current flow or metallic ion transport vital to an electroplating process while blocking residue and debris harmful to the electroplating process.

The present invention also provides a hydrophilic microporous electrochemical cell separator material as a residue barrier for particulates and debris, yet permits substantially unimpeded transport of electrolyte through the separator.

The present invention also provides a hydrophilic microporous drug delivery membrane having an extremely thin hydrophilic polymer shell which imparts hydrophilicity to the microporous membrane without otherwise substantially altering the membrane.

The present invention also provides a microporous hydrophilic membrane filter, suitable for separating solids from fluids where the coating does not inhibit flux.

The present invention further provides an image forming substrate and method for preparing a permanent and undistorted image of an image-forming substance in a medium comprising loading the image-forming substance into a porous, polymeric receptive medium in at least one location to form an image, heating the receptive medium to a temperature sufficient to fuse pores of the receptive medium and restructure the receptive medium into an essentially transparent film encapsulating the image in each location where the image was loaded, the receptive medium comprising a hydrophobic microporous polymeric substrate having coated on at least one external surface and on the internal surface a polyamide.

DETAILED DESCRIPTION OF THE INVENTION

Hydrophilic porous articles of the present invention may be in the form of membranes, films, beads, fibers, hollow fibers, fabrics and the like. Since the most used form is a flat porous sheet or membrane, this form will be exemplified. However, it will be understood that the inventive article can take any form. The term "porous material" as used herein is inclusive of porous and microporous membranes, films, beads, fibers, hollow fibers, fabrics and the like.

Porous and microporous articles of the invention have a structure that enables fluids to flow into or through them. The effective pore size of the structure is at least several times the mean free path of the flowing molecules, namely from several micrometers down to about 100 Angstroms. Such articles are generally opaque, even when made of transparent material, because the surfaces and the internal structure scatter visible light.

The substrate can be made from any material which may be formed into a porous or microporous structure. Preferably, the structure is polymeric. Polymeric substrates can be formed from, for example, polyolefins, polyhaloolefins, polyesters, polyimides, polyetherimides, polysulfones, polyethersulfones, polycarbonates, and the like. Suitable polyolefins include, for example, polyethylene, polypropylene, poly-3-methyl-1-butene, poly-4-methyl-1-butene, and copolymers of ethylene, propylene, 3-methyl-1-butene, or 4-methyl-1-butene with each other or with minor amounts of other olefins. Suitable polyhaloolefins include, for example, polytetrafluoroethylene and polyvinylidene fluoride. Suitable polyesters include polyethylene terephthalate and polybutylene terephthalate.

The polyamide coating is preferably formed from nylon polymers such as nylon 6, nylon 66, block copolymers of nylon 6 or nylon 66 and polyethylene glycol and blends thereof.

Nylon solutions useful in preparing the coated substrates of the present invention can be prepared using a calcium chloride/methanol solvent system. Preferably, the calcium chloride is in the form of the dihydrate and the solvent system is not a saturated solution of calcium chloride dihydrate in methanol as such solutions have a very high viscosity making it difficult to coat the internal surfaces of porous membranes. Surprisingly, it has been found that most non-alcohol soluble nylons, that are soluble in a saturated solution of calcium chloride/methanol, continue to be soluble in such a solvent system with less than saturated solutions when the solution is heated. Preferably, the solvent system contains at least about 10 weight percent calcium chloride dihydrate. At amounts greater than about 10 weight percent calcium chloride dihydrate, e.g., about 25 weight percent, the resulting solutions remain stable for extended periods of time at room temperature. At amounts of less than about 10 weight percent calcium chloride dihydrate, non-alcohol soluble polyamides are not stable for extended periods and precipitate at room temperature over time. A solvent system of 12 to 15 weight percent calcium chloride dihydrate in methanol or ethanol is more preferred. This system allows a room temperature solution of about 2 to 3 weight percent nylon which quickly and evenly coats both the internal surfaces and exterior portions of porous hydrophobic membranes to provide the hydrophilic porous membranes of this invention. The coated pores are let open for passage of fluid through them.

It has been found that water is desirable as a co-solvent in this alcohol/salt system to make a clear polymer solution and can be introduced as either the hydrate of calcium chloride or as water. The water concentration for each solvent system must be adjusted for the particular nylon being dissolved but preferably is in the range of 20 to 100 weight percent water with respect to the weight of calcium chloride.

The method for making the hydrophilic microporous polymeric article of the present invention involves coating the porous hydrophobic membrane surface and internal pore surfaces with a dilute solution of a polyamide or a mixture of polyamides followed by solvent-nonsolvent exchange to remove the calcium chloride and alcohol, and drying. The resulting coated hydrophilic articles may be optionally oriented with heat.

The following examples further illustrate this invention but the particular materials and amounts thereof as well as the conditions used in these examples should not be construed to unduly limit this invention. In the examples, all part and percentages are by weight unless otherwise specified.

In the examples, tests were conducted as follows.
Bubble Point Pore Size
Bubble point pore size, "pore size," is the maximum effective pore size, in microns, as measured according to ASTM F-316.
Void Volume
The void volume of the article is derived from the specific gravity of the article measured according to ASTM D-792.
Tensile Strength
Tensile strength is measured according to ASTM Test Method D 638-80 using an INSTRON model 1122 tensile tester under the following conditions:
   Jaw Gap: 5.08 cm
   Jaw Speed: 50.8 cm/min
   Sample Size: 2.54 cm wide strip
MD and TD values for tensile strength refer to measurements made in the machine direction and the transverse direction, respectively.
Water Flux
A 4-liter reservoir was filled with high purity water prepared by filtering deionized water through a Millipore Milli-Q laboratory water purification system. Two pressure gauges were installed before and after a 25 mm disk membrane holder having an effective filtration surface area of 3.8 $cm^2$ to monitor the differential pressure across the membrane. To further remove any particulates releasing from the test system, an additional 47 mm disk membrane holder as an in-line prefilter was also installed upstream from the actual sample holder and from the upstream pressure gauge. A 0.2 micron rated commercial nylon 66 membrane was used as the prefilter.

Using this water reservoir system pressurized with nitrogen, the water flux was determined by recording the time for passing a given amount of high purity water, at least 2 liters, through the test membrane disk. All of the measurements were conducted at 10 psi differential pressure.

Thermal stability

Samples were prewetted with water, placed on watch glasses, and then autoclaved at 121° C. for 10 minutes. The autoclaved samples were dried and then soaked in water at ambient conditions for visual inspection of their wettability.

Chemical Stability

The coated membranes were allowed to soak in a methanol bath at 35° C. After removing methanol by drying at ambient conditions, water wetting tests were carried out to examine whether the treated membranes retained their water wettable character.

EXAMPLE 1 and COMPARATIVE EXAMPLE C1

In Example 1, 25 weight percent $CaCl_2.2H_2O$ was disolved in 73 weight percent methanol. To this was added 2 weight percent solution of nylon 66 (obtained from DuPont, ZYTEL 101) and the nylon was dissolved by refluxing. A microporous polypropylene membrane prepared as in U.S. Pat. No. 4,726,989 (Mrozinski) by thermally-induced phase separation having a bubble point pore size of 1.07 μm, a void volume of 82.4% and thickness of 0.094 mm was saturated at room temperature with the thus-prepared solution. The coated membrane was rinsed with water to remove the $CaCl_2.2H_2O$ and methanol, and dried at ambient conditions. To enhance the hydrophilicity, the same procedure was repeated to double coat the base membrane. The resulting membrane was spontaneously and nearly instantaneously wet with water. The hydrophilized membrane had a bubble point pore size pf 0.97 μm and a thickness of 0.089 mm.

Comparative Example 1 is the untreated membrane used in Example 1.

The coated membrane of Example 1 was tested for water flux, chemical stability, thermal stability, and tensile strength. The membrane of Comparative Example 1 was tested for water flux and tensile strength. The results are set forth in Table 2.

EXAMPLES 2 and 3 and COMPARATIVE EXAMPLE C2

A solution containing 3 weight percent nylon 6 (NYCOA 471, available from Nylon Corporation of America), 15 weight percent $CaCl_2.2H_2O$ and 82 weight percent methanol was prepared as in Example 1. In Example 2, a microporous high-density polyethylene membrane prepared as described in U.S. Pat. No. 4,539,296 (Shipman) by thermally-induced phase separation having a bubble point pore size of 0.87 μm, a void volume of 83 and a thickness of 0.1 mm, was saturated at room temperature with the solution. Comparative Example 2 is the untreated membrane used in Example 2.

The coated membranes were tested for water flux, chemical stability, thermal stability, and tensile strength. The membrane of Comparative Example 2 was tested for water flux and tensile strength. The results are set forth in Table 2.

In Example 3, a 0.12 mm thick hydrophobic microporous polyvinylidene fluoride membrane (available from Millipore Corporation) having a bubble point pore size of 0.9 μm and void volume of ~66% was saturated with the solution of Example 2. Each membrane was rinsed with water and dried at ambient conditions. The resulting membranes were spontaneously and nearly instantaneously wet with water.

The coated membranes were tested for water flux, chemical stability, thermal stability, and tensile strength. The membrane of Comparative Example 2 was tested for water flux and tensile strength. The results are set forth in Table 2.

EXAMPLE 4 and COMPARATIVE EXAMPLE C3

In Example 4, a solution containing 1 weight percent HYDROFIL nylon 6 (a block copolymer of nylon 6 and polyethylene glycol, #3318-49-6, available from Allied Fibers, Inc.), 1 weight percent nylon 6 (NYCOA 471), 15 weight percent $CaCl_2.2H_2O$ and 83 weight percent methanol was prepared as in Example 1. A 0.05 mm thick hydrophobic polypropylene membrane produced as in U.S. Pat. No. 4,726,989 (Mrozinski) having a bubble point pore size of 1.35 μm and a void volume of 85% was saturated with the solution. The membrane was then rinsed with water and dried at ambient conditions. The resulting membrane was spontaneously and nearly instantaneously wet with water.

Comparative Example C3 is the untreated membrane used in Example 4.

The coated membrane of Example 4 was tested for water flux, chemical stability, thermal stability, and tensile strength. The membrane of Comparative Example C3 was tested for water flux and tensile strength. The results are set forth in Table 2.

EXAMPLE 5 and COMPARATIVE EXAMPLE C4

In Example 5, a solution containing 1 weight percent HYDROFIL nylon 6, 1 weight percent nylon 66 (ZYTEL 101), 25 weight percent $CaCl_2.2H_2O$ and 73 weight percent methanol was prepared as in Example 1. A hydrophobic polyethylene membrane as described in Example 2 was saturated with the solution. The membrane was then rinsed with water and dried at ambient conditions. The resulting membrane was spontaneously and nearly instantaneously wet with water.

Comparative Example C4 is the untreated membrane used in Example 5.

The coated membrane of Example 5 was tested for water flux, chemical stability, thermal stability, and tensile strength. The membrane of Comparative Example C4 was tested for water flux and tensile strength. The results are set forth in Table 2.

EXAMPLES 6–12 and COMPARATIVE C5

A solution containing 2 weight percent HYDROFIL nylon 6, 15 weight percent $CaCl_2.2H_2O$ and 83 weight percent methanol as in Example 1. A microporous high-density polyethylene (HDPE) membrane prepared as described in U.S. Pat. No. 4,539,296 (Shipman) by thermally-induced phase separation having a bubble point pore size of 0.87 μm, a void volume of 83% and a thickness of 0.1 mm, was saturated at room temperature with the 2 weight percent HYDROFIL nylon 6 solution. The coated membrane was rinsed with water to remove the $CaCl_2.2H_2O$ and methanol and dried at ambient conditions. The resulting hydrophilized HDPE membrane had a bubble point pore size of 0.76 μm and a void volume of 75% and a weight gain of 11.9%. Differential scanning calorimetry confirmed the presence of the HYDROFIL nylon 6.

Permanency of the HYDROFIL nylon 6 coating on the porous membrane was tested under several conditions. No measurable weight loss occurred when the hydrophilized HDPE membrane was flushed with at least 12 liters of deionized water, boiled in water for 2 hours, and immersed in a 31 weight percent potassium hydroxide solution at 70° C. for 280 hours. The re-dried membrane retained its hydrophilicity as shown by instantaneous wetting with water.

Comparative Example C5 is the untreated membrane used in Example 6.

In Examples 7–12, various microporous substrates as set forth in Table 1 were saturated with the 2 weight percent I-IYDROFIL nylon 6 solution as in Example 6, rinsed with water and dried at ambient conditions. The resulting membranes were spontaneously and nearly instantaneously wet with water.

TABLE 1

| Example | Substrate |
|---|---|
| 7 | Microporous polypropylene membrane 0.05 mm thick, 1.35 μm bubble point pore size, 85% void volume, prepared according to U.S. Pat. No. 4,726,989 (Mrozinski) |
| 8 | Microporous polysulfone membrane (0.45 mm pore size, available from Schleicher and Schuell Company, rinsed with isopropanol to remove surfactant) |
| 9 | Microporous polyvinylidene fluoride membrane (0.12 μm thick, 0.9 μm bubble point pore size, 66% void volume, available from Millipore Corp.) |
| 10 | Isoporous polycarbonate membrane (0.02 μm thick, 0.2 μm rated pore size, 26% void volume, available from Biopore, Inc.) |
| 11 | Microporous polytetrafluoroethylene membrane (FLUOROPORE Type FP-1000, available from Sumitomo Electric Industries, Ltd.) |
| 12 | Isoporous polyethylene terephthalate membrane (0.011 μm thick, 0.8 μm rated pore size, available from Cyclopore, Inc.) |

The coated membranes of Examples 6–12 were tested for water flux, chemical stability and thermal stability. The membrane of Comparative Example C5 was tested for water flux and tensile strength. The results are set forth in Table 2.

TABLE 2

| Ex. | Water Flux (cm³/cm² · min) | Chemical Stability | Thermal Stability | Tensile Strength (kPa) MD | Tensile Strength (kPa) TD |
|---|---|---|---|---|---|
| 1 | 33.9 | yes | yes | 8990 | 8490 |
| C1 | 0 | — | — | 6390 | 6680 |
| 2 | 6.6 | yes | yes | 8670 | 6120 |
| C2 | 0 | — | — | 6880 | 4440 |
| 3 | 12.7 | yes | yes | — | — |
| 4 | 30.8 | yes | yes | 9860 | 8190 |
| C3 | 0 | — | — | 5990 | 5960 |
| 5 | 9.9 | yes | yes | 8910 | 5740 |
| C4 | 0 | — | — | 6880 | 4440 |
| 6 | 7.6 | yes | yes | 8390 | 5230 |
| C5 | 0 | — | — | 6880 | 4440 |
| 7 | 30.3 | yes | yes | — | — |
| 8 | 33.5 | yes | yes | — | — |
| 9 | 12.4 | yes | yes | — | — |
| 10 | 3.9 | yes | yes | — | — |
| 11 | — | yes | yes | — | — |
| 12 | 46.0 | yes | yes | — | — |

COMPARATIVE EXAMPLES C6 and C7

A coating solution was prepared as in Example 2 of U.S. Pat. No. 4,654,265 (Kamei et at.) using an ethylene oxide grafted nylon 6 (graft ratio 1.3, available from Nisso Petrochemical Industries Co., Ltd.). In Comparative Example C6, the high density polyethylene membrane used Example 2 was saturated with the solution, rinsed and dried. In Comparative Example C7, the polypropylene membrane used in Example 4 was saturated with the solution, rinsed and dried. The treated sample were tested for thermal and chemical stability. The samples remained hydrophilic after autoclaving at 121° C. for 10 minutes. Samples of each of Comparative Examples C6 and C7 became hydrophobic after soaking in a methanol bath at 35° C. for only 5 minutes, demonstrating the samples had poor chemical stability.

EXAMPLES 13–17

In Examples 13–17, various fabrics, set forth in Table 3 were saturated with solution prepared as in Example 6, rinsed and dried.

TABLE 3

| Example | Substrate |
|---|---|
| 13 | Spunbonded polypropylene (17 g/m²), available from Celestra Corp.) |
| 14 | Spunbonded polyethylene (TYVEK T-984, available from DuPont Company) |
| 15 | Meltblown polypropylene (40 g/m², prepared according to Wente, Van A., "Superfine Thermoplastic Fibers," Engineering Chemistry, v. 48, 1956, p. 1342 et seq.) |
| 16 | Woven polypropylene fabric (available from Arthur Kahn Co., not penetrable by water droplet) |
| 17 | Spunbonded polyester (REEMAY Style 2011, 0.14 μm thick, 24 g/m², available from Ahlstrom Filtration, Inc.) |

The resulting fabrics were spontaneously and nearly instantaneously wet with water.

The coated fabrics of Examples 13–17 were tested for chemical stability and thermal stability. Each coated fabric was both chemically and thermally stable.

Various modifications and alterations of this invention will be apparent to those skilled in the art without departing from the scope and spirit of this invention and this invention should not be restricted to that set forth herein for illustrative purposes.

What is claimed is:

1. A hydrophilic porous article comprising a hydrophobic porous polymeric substrate having both external surfaces and internal pore-defining surfaces and having a thin hydrophilic polyamide shell coated on at least one external surface and on the internal pore-defining surfaces, while leaving the pores open for passage of fluid through the pores.

2. The article of claim 1 wherein the polymeric substrate is polyolefin, polyhaloolefin, polyester, polyimide, polyetherimide, polysulfone, polyethersulfone, or polycarbonate.

3. The article of claim 1 wherein the polymeric substrate is a porous membrane, a microporous membrane, porous film, porous beads, porous fibers, porous hollow fibers, or fabric.

4. The article of claim 3 wherein said polymeric substrate is a microporous membrane.

5. The article of claim 4 wherein said membrane comprises a polyolefin, polyhaloolefin, polyester, polyimide, polyetherimide, polysulfone, polyethersulfone, or polycarbonate.

6. The article of claim 1 wherein the polyamide is nylon 6, nylon 66, block copolymers of nylon 6 or nylon 66 with polyethylene glycol, or blends thereof.

7. The article of claim 1 wherein the article is chemically stable.

8. The article of claim 1 wherein the article is thermally stable.

9. An electroplating residue barrier comprising the article of claim 1.

10. An electrochemical cell separator comprising the article of claim 1.

11. A microporous drug delivery membrane comprising the article of claim 1.

12. A hydrophilic porous article comprising a hydrophobic microporous polymeric substrate that comprises polyethylene, the substrate having both external surfaces and internal pore-defining surfaces and having a thin hydrophilic polyamide shell coated on at least one external surface and on the internal pore-defining surfaces while leaving the pores open for passage of fluid through the pores.

13. A hydrophilic porous article comprising a hydropobic microporous substrate that comprises polypropylene, the substrate having both external surfaces and internal pore-defining surfaces and having a thin hydrophilic polyamide shell coated on at least one external surface and on the internal pore-defining surfaces while leaving the pores open for passage of fluid through the pores.

* * * * *